(12) United States Patent
Yamane et al.

(10) Patent No.: US 9,737,883 B2
(45) Date of Patent: Aug. 22, 2017

(54) HYDROGENATION CATALYST AND METHOD FOR PRODUCING SAME

(71) Applicant: JGC CATALYSTS AND CHEMICALS LTD., Kawasaki-shi, Kanagawa (JP)

(72) Inventors: Kenji Yamane, Kitakyushu (JP); Kouichi Ohama, Kitakyushu (JP); Shogo Tagawa, Kitakyushu (JP)

(73) Assignee: JGC CATALYSIS AND CHEMICALS LTD., Kawasaki (JP)

( * ) Notice: Subject to any disclaimer, the term of this patent is extended or adjusted under 35 U.S.C. 154(b) by 0 days.

(21) Appl. No.: 14/349,105

(22) PCT Filed: Oct. 22, 2012

(86) PCT No.: PCT/JP2012/077216
§ 371 (c)(1),
(2) Date: Apr. 2, 2014

(87) PCT Pub. No.: WO2013/061913
PCT Pub. Date: May 2, 2013

(65) Prior Publication Data
US 2014/0243192 A1 Aug. 28, 2014

(30) Foreign Application Priority Data
Oct. 24, 2011 (JP) .................. 2011-233148

(51) Int. Cl.
*B01J 27/16* (2006.01)
*B01J 27/19* (2006.01)
(Continued)

(52) U.S. Cl.
CPC ............... *B01J 27/19* (2013.01); *B01J 27/16* (2013.01); *B01J 31/121* (2013.01);
(Continued)

(58) Field of Classification Search
CPC ........... B01J 23/28; B01J 23/883; B01J 21/04
(Continued)

(56) References Cited

U.S. PATENT DOCUMENTS 4,257,922 A * 3/1981 Kim et al. .................... 502/315
4,395,328 A 7/1983 Hensley, Jr. et al.
(Continued)

FOREIGN PATENT DOCUMENTS

CN 101679025 A 3/2010
EP 1 552 880 A1 7/2005
(Continued)

OTHER PUBLICATIONS

International Search Report issued in International Patent Application No. PCT/JP2012/077216 mailed Jan. 29, 2013.
(Continued)

*Primary Examiner* — Melvin C Mayes
*Assistant Examiner* — James Corno
(74) *Attorney, Agent, or Firm* — Oliff PLC

(57) ABSTRACT

A hydrotreating catalyst includes a hydrogenation active metal supported on a alumina-phosphorus support and satisfies: a specific surface area being 100 m²/g or more; a total pore volume measured by mercury intrusion being in a range 0.80-1.50 ml/g; a maximum value of pore distribution being present in a pore diameter range 10-30 nm; a ratio of a pore volume of pores with a pore diameter within a range of ±2 nm of a pore diameter at the maximum value to a pore volume of pores with a pore diameter in a range 5-100 nm being 0.40 or less; a pressure capacity being 10 N/mm or more; 0.4-10.0 mass % of phosphorus being contained in the catalyst in terms of $P_2O_5$ concentration based on a total amount of the catalyst; and a hydrogenation active metal being at least one metal selected from metals of VIA and VIII groups of the periodic table.

15 Claims, 2 Drawing Sheets

(51) Int. Cl.
*B01J 31/12* (2006.01)
*B01J 35/10* (2006.01)
*C10G 45/04* (2006.01)
*B01J 37/02* (2006.01)
*B01J 37/03* (2006.01)
*B01J 37/28* (2006.01)

(52) U.S. Cl.
CPC ....... *B01J 35/1019* (2013.01); *B01J 35/1042* (2013.01); *B01J 35/1047* (2013.01); *B01J 35/1061* (2013.01); *B01J 37/0203* (2013.01); *B01J 37/024* (2013.01); *B01J 37/033* (2013.01); *C10G 45/04* (2013.01); *B01J 35/109* (2013.01); *B01J 35/1085* (2013.01); *B01J 37/28* (2013.01); *C10G 2300/201* (2013.01)

(58) Field of Classification Search
USPC ........................................................ 502/314
See application file for complete search history.

(56) References Cited

U.S. PATENT DOCUMENTS

| | | | |
|---|---|---|---|
| 4,399,057 A | | 8/1983 | Hensley, Jr. et al. |
| 4,552,650 A | * | 11/1985 | Toulhoat et al. ....... 208/216 PP |
| 5,089,463 A | * | 2/1992 | Johnson ........................ 502/313 |
| 6,207,611 B1 | | 3/2001 | Sun et al. |
| 6,780,817 B1 | | 8/2004 | Koyama et al. |
| 2005/0107479 A1 | * | 5/2005 | Espinoza et al. ............. 518/718 |
| 2005/0211603 A1 | * | 9/2005 | Guillaume et al. ......... 208/111.3 |
| 2006/0249429 A1 | | 11/2006 | Iki et al. |

FOREIGN PATENT DOCUMENTS

| | | |
|---|---|---|
| JP | S58-252 A | 1/1983 |
| JP | A-2005-169232 | 6/2005 |
| JP | A-2006-35052 | 2/2006 |
| JP | A-2006-181562 | 7/2006 |
| JP | 2006-342288 A | 12/2006 |
| JP | A-2006-341221 | 12/2006 |
| JP | 2008-290043 A | 12/2008 |
| JP | 2009-101362 A | 5/2009 |
| JP | 2010-248476 A | 11/2010 |
| JP | 2011-067748 A | 4/2011 |
| JP | 2011-072928 A | 4/2011 |
| WO | WO 00/33957 A1 | 6/2000 |
| WO | 02/43862 A2 | 6/2002 |

OTHER PUBLICATIONS

S.G. Kukes et al., Preprints—American Chemical Society, Division of Petroleum Chemistry. Symposium on advances in resid upgrading, American Chemical Society Denver Meeting, Apr. 5-10, 1987, vol. 32, No. 2, p. 432-436 (1987).
"Petroleum Refining Process" edited by Japan Petroleum Institute, Kodansha Ltd., Published on May 20, 1998, p. 41-46.
Nov. 17, 2015 Office Action issued in Japanese Application No. 2011-233148.
Oct. 9, 2015 Information Offer Form issued in Japanese Application No. 2011-233148.
Jun. 25, 2015 extended European Search Report issued in Application No. 12843751.4.
Mar. 10, 2016 Office Action issued in Taiwanese Patent Application No. 101139040.

* cited by examiner

HYDROGENATION CATALYST AND METHOD FOR PRODUCING SAME

TECHNICAL FIELD

The present invention relates to a hydrotreating catalyst and a method for producing the hydrotreating catalyst and particularly to a hydrotreating catalyst used for hydrotreating heavy hydrocarbon oil such as a residual oil containing metal pollutant (e.g. vanadium and nickel) and a method for producing the same.

BACKGROUND ART

In a pre-treatment process of heavy hydrocarbon oil, in addition to high demetallization performance and desulfurization performance, deasphaltene performance is required. Heavy oil is rich in asphaltene that is large in molecular weight and contains a large amount of metal. Accordingly, in order to highly demetallize the heavy oil, it is necessary to subject the heavy oil to a hydrotreatment. If the asphaltene in material oil is not sufficiently hydrotreated during the hydrotreatment process of the heavy hydrocarbon oil, a base material is produced in a form of a product oil with a large proportion of dry sludge. The base material with a large proportion of dry sludge is low in storage stability and causes various troubles. Thus, it is important to highly hydrotreat the asphaltene in the material oil.

In order to hydrotreat asphaltene with a large molecular weight, a catalyst with enlarged pores and a bimodal catalyst having two peaks of pore distribution have been developed so far. In recent years, in order to treat a heavier material oil or to reduce a burden on R-FCC processing after the hydrotreatment process, a further improvement in the performance of the catalyst has been demanded.

For instance, Patent Literature 1 discloses a bimodal catalyst having mesopores in a range from 7 to 20 nm and macropores in a range of 300 to 800 nm that exhibits high demetallization performance and desulfurization performance.

CITATION LIST

Patent Literature(s)

Patent Literature 1 JP-A-2006-181562

SUMMARY OF THE INVENTION

Problem(s) to be Solved by the Invention

However, since significant increase in deasphaltene performance cannot be usually expected unless the diameter of the catalyst pores exceeds 20 nm, even if macropores are present as in the catalyst disclosed in Patent Literature 1, the primary reaction pores in the form of the mesopores are not necessarily effective for deasphaltene reaction. In addition, it is disclosed in Patent Literature 1 that the macropores are formed by adding an easily-decomposable substance to a kneaded material while preparing a support and calcining the kneaded material to remove the substance. However, such a method requires a large amount of easily-decomposable substance and productivity is deteriorated due to the need for the calcining, resulting in a high production cost.

An object of the invention is to provide a hydrotreating catalyst that exhibits excellent demetallization performance and deasphaltene performance, and a method for producing the catalyst with high productivity.

Means for Solving the Problem(s)

After a vigorous study, the inventors have found that a catalyst including a hydrogenation active metal supported on a predetermined alumina-phosphorus support with a maximum value of pore distribution in a pore diameter range from 10 to 30 nm and a wide pore distribution over a pore diameter range from 5 to 100 nm exhibits excellent demetallization performance and deasphaltene performance. Further, the above problem of improvement in productivity during the catalyst production can be achieved, thereby reaching the invention.

Specifically, the invention provides a hydrotreating catalyst and a method for producing the hydrotreating catalyst as follows.

[1] A hydrotreating catalyst that includes: an alumina-phosphorus support; and a hydrogenation active metal supported on the alumina-phosphorus carrier, where:
(1) a specific surface area of the hydrotreating catalyst is 100 $m^2/g$ or more;
(2) a total pore volume ($PV_T$) of the hydrotreating catalyst measured according to a mercury intrusion method being in a range from 0.80 to 1.50 ml/g;
(3) the hydrotreating catalyst has a maximum value of pore distribution in a pore diameter range from 10 to 30 nm;
(4) a ratio ($\Delta PV/PVme$) of a pore volume ($\Delta PV$) of pores with a pore diameter within a range of $\pm 2$ nm of a pore diameter at the maximum value to a pore volume (PVme) of pores with a pore diameter in a range from 5 to 100 nm is 0.40 or less;
(5) a pressure capacity of the hydrotreating catalyst is 10 N/mm or more;
(6) 0.4 to 10.0 mass % of phosphorus is contained in the hydrotreating catalyst in terms of $P_2O_5$ concentration based on a total amount of the hydrotreating catalyst; and
(7) the hydrogenation active metal is at least one metal selected from metals of VIA and VIII groups of the periodic table.

[2] The above-described hydrotreating catalyst according to the invention, where the alumina-phosphorus support contains 0.5 to 7.0 mass % of phosphorus in terms of $P_2O_5$ concentration based on a total amount of the support.

[3] The above-described hydrotreating catalyst according to the invention, where the hydrotreating catalyst contains 1 to 25 mass % of the hydrogenation active metal in terms of oxide concentration based on the total amount of the hydrotreating catalyst.

[4] The above-described hydrotreating catalyst according to the invention, where the hydrotreating catalyst has a second maximum value of the pore distribution in a pore diameter range from 100 to 1000 nm.

[5] The above-described hydrotreating catalyst according to the invention, where a ratio (PVma/PVme) of a pore volume (PVma) of pores having a pore diameter in the range from 100 to 1000 nm to the pore volume (PVme) of pores having the pore diameter in the range from 5 to 100 nm is in a range from 0.1 to 0.5.

[6] The above-described hydrotreating catalyst according to the invention, where the hydrotreating catalyst is used for treating a heavy hydrocarbon oil.

[7] A method for producing a hydrotreating catalyst, the method including: producing an alumina-phosphorus support; and supporting a hydrogenation active metal on the alumina-phosphorus support, where the producing of the support includes: a first step of obtaining an alumina hydrate by preparing an acidic aluminum aqueous solution of which pH is adjusted in a range from 2.0 to 5.0 and, while agitating the acidic aluminum aqueous solution, adding a basic aluminum aqueous solution so that the pH falls in a range from 7.5 to 10.0; a second step of obtaining an alumina-phosphorus hydrate by adding phosphorus to the alumina hydrate from which a residual product salt of the alumina hydrate is removed; and a third step of obtaining an alumina-phosphorus support by aging, kneading, molding, drying and calcining the alumina-phosphorus hydrate in turn.

[8] The above-described method for producing a hydrotreating catalyst according to the invention, where phosphorus is added to the alumina hydrate in the second step so that 3.0 to 7.0 mass % of phosphorus in terms of $P_2O_5$ concentration based on a total amount of the support is contained in the alumina hydrate.

[9] The above-described method for producing a hydrotreating catalyst according to the invention, where phosphorus is added to the alumina hydrate in the second step so that 0.5 to 2.5 mass % of phosphorus in terms of $P_2O_5$ concentration based on a total amount of the support is contained in the alumina hydrate.

The hydrotreating catalyst according to the invention exhibits excellent demetallization performance and deasphaltene performance. Thus, the hydrotreating catalyst according to the invention is useful especially as a hydrotreating catalyst for heavy hydrocarbon oil.

Further, since the method for producing the hydrotreating catalyst of the invention is simple and thus is highly productive, the hydrotreating catalyst is advantageous in terms of production cost.

BRIEF DESCRIPTION OF DRAWING(S)

DESCRIPTION OF EMBODIMENT(S)

Figure 1A:
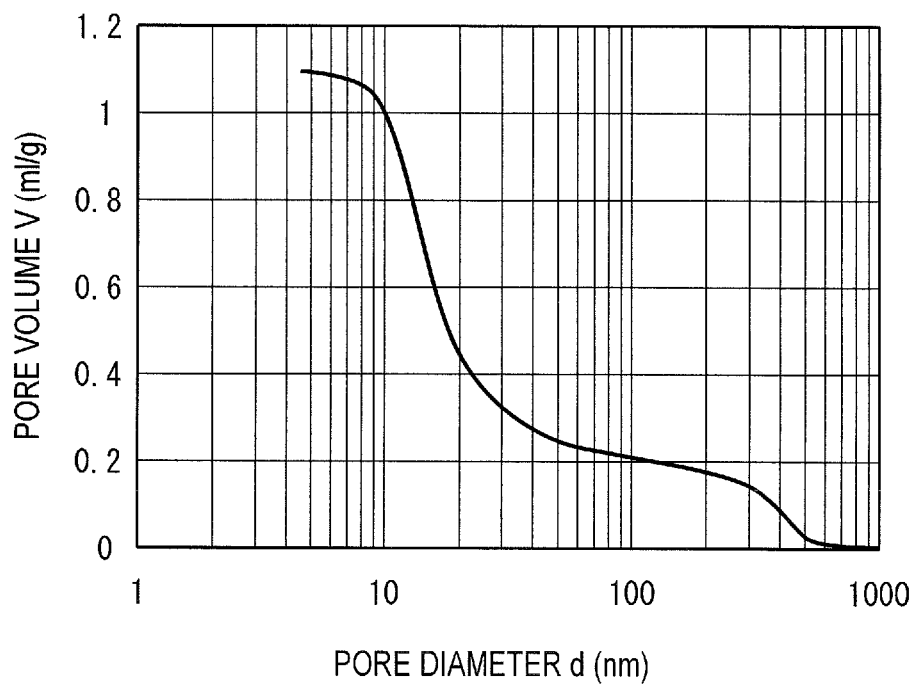
FIG. 1A is an integral graph showing a pore distribution of a catalyst A according to the invention.

A hydrotreating catalyst according to the invention (sometimes referred to as "the present catalyst" hereinafter) is a catalyst where a hydrogenation active metal is supported on an alumina-phosphorus support.

The alumina-phosphorus support herein may be composed solely of alumina and phosphorus oxide or, alternatively, may additionally contain inorganic oxide such as silica, boria, titania, zirconia and manganese oxide. In order to maintain the strength of the support and keep the production cost down, the support preferably contains 65 mass % or more, more preferably 75 to 99 mass % of alumina based on the total amount of the support.

Exemplary embodiment(s) of the invention will be detailed below.

(1) 100 $m^2/g$ or More of Specific Surface Area

The specific surface area of the present catalyst is 100 $m^2/g$ or more. When the specific surface area is less than 100 $m^2/g$, though the demetallization performance is affected only a little, desulfurization reaction speed tends to be considerably lowered. The specific surface area is preferably within a range from 150 to 250 $m^2/g$. Even when the specific surface area exceeds 250 $m^2/g$, while the advantages of the invention are not greatly enhanced, demetallization performance (demetallization selectivity) and/or stability of catalyst activity may be reduced. It should be noted that the specific surface area of the invention is a value measured according to BET method.

(2) Total Pore Volume ($PV_T$) Measured According to Mercury Intrusion Method Being in a Range from 0.80 to 1.50 ml/g A total pore volume ($PV_T$) of the present catalyst is within a range from 0.80 to 1.50 ml/g. When the total pore volume ($PV_T$) is less than 0.80 ml/g, the period for the present catalyst to be capable of demetallization tends to be shortened. When the total pore volume is greater than 1.50 ml/g, the catalyst strength is reduced. The total pore volume ($PV_T$) is preferably in a range from 0.85 to 1.40 ml/g, more preferably in a range from 0.90 to 1.30 ml/g. It should be noted that the total pore volume ($PV_T$) in the invention means a pore volume of pores of which pore diameter is in a range from 3.2 to 10000 nm.

The pore diameter, pore volume and pore distribution in the invention are measured according to mercury intrusion method. The pore diameter is a value calculated based on a mercury surface tension of 480 dyne/cm and a contact angle of 150 degrees.

(3) Maximum Value of Pore Distribution Being Present in a Pore Diameter Range from 10 to 30 nm The pore distribution of the present catalyst is maximized in a pore diameter range from 10 to 30 nm. When the maximum value is in a pore diameter range of less than 10 nm, demetallization performance is considerably reduced. On the other hand, when the maximum value is in a pore diameter range exceeding 30 nm, the desulfurization performance tends to be unfavorably reduced. The favorable pore diameter range in which the maximum value is present is from 12 to 25 nm, more preferably from 15 to 20 nm.

(4) A Ratio ($\Delta PV/PVme$) of Pore Volume ($\Delta PV$) of Pores with Pore Diameter within a Range of ±2 nm of Pore Diameter at the Maximum Value to Pore Volume (PVme) of Pores with Pore Diameter in a Range from 5 to 100 nm Being 0.40 or Less According to the pore distribution of the present catalyst, a ratio ($\Delta PV/PVme$) of a pore volume ($\Delta PV$) of pores with a pore diameter within a range of ±2 nm of a pore diameter at the maximum value to a pore volume (PVme) of pores with a pore diameter in a range from 5 to 100 nm is 0.40 or less. When $\Delta PV/PVme$ exceeds 0.40, a reactivity to asphaltene molecules is reduced, thereby unfavorably reducing the demetallization performance and deasphaltene performance.

(5) Pressure Capacity of 10 N/mm or More

The pressure capacity of the present catalyst is 10 N/mm or more. When the pressure capacity is less than 10 N/mm, the catalyst is likely to be damaged when being loaded, thereby causing uneven flow or pressure loss at the time of a reaction. Thus, the pressure capacity must be 10 N/mm or more. It should be noted that the pressure capacity is also referred to as a crush strength and the pressure capacity in the invention is measured with a Kiya hardness tester.

(6) Phosphorus Contained in a $P_2O_5$ Concentration Conversion Amount of 0.4 to 10.0 mass % Based on a Total Amount of Catalyst The present catalyst contains 0.4 to 10.0 mass % of phosphorus in a $P_2O_5$ concentration conversion amount based on a total amount of the catalyst. Less than 0.4 mass % of phosphorus is not preferable because the catalyst strength (abrasion resistance) is reduced. More than 10.0 mass % of phosphorus is not preferable because of decrease in the specific surface area of the catalyst. The content of phosphorus in the catalyst is preferably in a range from 0.5 to 10.0 mass %, more preferably from 1.0 to 8.0 mass %, further preferably from 2.0 to 7.0 mass %.

The content of phosphorus in the alumina-phosphorus support constituting the present catalyst is preferably in a range from 0.5 to 7.0 mass %, more preferably from 1.0 to 6.0 mass %, further preferably from 1.5 to 5.5 mass % in a $P_2O_5$ concentration conversion amount based on the total amount of the support.

When the content of phosphorus in the support is less than 0.5 mass %, the catalyst strength may be reduced. Further, an object of the invention (i.e. wide pore distribution in a pore diameter range of 5 to 100 nm) may become difficult to be achieved. On the other hand, when the content of phosphorus in the support exceeds 7.0 mass %, the volume occupied by pores with pore diameters in a range from 100 to 1000 nm becomes excessively large, thereby reducing the catalyst strength. In addition, a bulk density of the catalyst may be reduced to lower the catalyst performance.

(7) Hydrogenation Active Metal Being at Least One Metal Selected from VIA and VIII Groups of the Periodic Table The hydrogenation active metal supported on the present catalyst is at least one metal selected from VIA and VIII groups of the periodic table. The amount of the hydrogenation active metal supported on the catalyst is preferably in a range from 1 to 25 mass %, more preferably from 3 to 20 mass %, further preferably from 3 to 15 mass % in terms of oxide thereof based on the total amount of the catalyst. When the amount of the supported metal accounts for 1 mass % or more of the catalyst, the advantage(s) of the invention can be further eminently exhibited. Further, when the amount of the supported metal accounts for 25 mass % or less of the catalyst, the demetallization performance (demetallization selectivity) and stability of catalyst activity can be favorably maintained and the production cost can be favorably reduced.

The metal supported on the support is preferably a combination of the above-described group VIA metal and group VIII metal of the periodic table in terms of reactivity. Preferable examples of the group VIA metal include molybdenum and tungsten. Preferable examples of the group VIII metal include nickel and cobalt.

The preferable amount of the group VIA metal of the periodic table supported on the catalyst is in a range from 1 to 20 mass %, more preferably 3 to 15 mass % in terms of oxide thereof. The preferable amount of the group VIII metal of the periodic table supported on the catalyst is in a range from 0.1 to 10 mass %, more preferably 0.3 to 5 mass % in terms of oxide thereof.

Next, a suitable embodiment for producing the present catalyst will be described below.

Method for Producing Alumina-Phosphorus Support

First Step

Acidic aluminum salt is added to base water to prepare an aqueous solution of 0.1 to 2.0 mass % of acidic aluminum in terms of $Al_2O_3$ with pH of 2.0 to 5.0. Then, while agitating the acidic aluminum aqueous solution, the temperature of the acidic aluminum solution is raised to 50 to 80 degrees Celsius, preferably to 60 to 70 degrees Celsius. Any water-soluble salt may be used as the acidic aluminum salt used in the invention. Examples of the usable salt are aluminum sulfate, aluminum chloride, aluminum acetate and aluminum nitrate. The aqueous solution preferably contains 0.5 to 20 mass %, more preferably 2 to 10 mass % of the acidic aluminum salt in terms of $Al_2O_3$.

Next, while agitating the acidic aluminum aqueous solution, a basic aluminum aqueous solution is added for 30 to 200 minutes, preferably for 60 to 180 minutes to adjust pH of the solution to a range from 7.5 to 10.0 to obtain an alumina hydrate. Examples of the basic aluminum salt usable in the invention are sodium aluminate and potassium aluminate. The basic aluminum aqueous solution preferably contains 2 to 30 mass %, more preferably 10 to 25 mass % of the basic aluminum salt in terms of $Al_2O_3$.

Second Step

Next, the obtained alumina hydrate is washed with pure water at 50 to 70 degrees Celsius, preferably 55 to 65 degrees Celsius to remove impurities such as sodium and sulfate radical to obtain a washed cake. Further, pure water is added to the washed cake to adjust the $Al_2O_3$ concentration in a range from 5 to 18 mass %, preferably from 7 to 15 mass %. Then, phosphorus is added to the alumina hydrate to obtain an alumina-phosphorus hydrate. The content of phosphorus in the support is preferably in a range from 0.5 to 7.0 mass %, more preferably from 1.0 to 6.0 mass %, further preferably from 1.5 to 5.5 mass % in terms of $P_2O_5$ concentration. Phosphoric acid, phosphorus acid and phosphate compounds such as ammonia phosphate, potassium phosphate and sodium phosphate are usable as the source of phosphorus.

Third Step

After the obtained alumina-phosphorus hydrate is aged at 30 degrees Celsius or higher, preferably at 80 to 100 degrees Celsius for 1 to 10 hours, preferably for 2 to 5 hours in an aging tank with a reflux apparatus, the alumina-phosphorus hydrate is turned into a moldable kneaded material with a common means (e.g. heating and kneading). Subsequently, the kneaded material is molded into a desired shape by extrusion or the like and is dried and calcined at 400 to 800 degrees Celsius for 0.5 to 10 hours to obtain an alumina-phosphorus support.

Method for Supporting Metal on Support

The hydrotreating catalyst of the invention can be produced using the above alumina-phosphorus support with the at least one metal selected from metals of VIA and VIII groups of the periodic table being supported on the support. Examples of the material of the metal are nickel nitrate, nickel carbonate, cobalt nitrate, cobalt carbonate, molybdenum trioxide, ammonium molybdate and ammonium paratungstate. The metals are supported on the support with a known process such as impregnation and dipping. The support with the metal being supported thereon is usually calcined for 0.5 to 5 hours at 400 to 600 degrees Celsius to form the hydrotreating catalyst of the exemplary embodiment of the invention.

In the second step in the method for producing the alumina-phosphorus support, when phosphorus is added to the support so that phosphorus accounts for 3.0 to 7.0 mass % of the total amount of the support in terms of $P_2O_5$ concentration, a catalyst having a second maximum value of pore distribution in a pore diameter range from 100 to 1000 nm can be obtained. The second maximum value in the pore distribution can enhance the deasphaltene performance and demetallization performance.

Further, in the catalyst having the second maximum value, when a ratio (PVma/PVme) of a pore volume (PVma) of pores having a pore diameter in a range from 100 to 1000 nm to a pore volume (PVme) of pores having a pore diameter in a range from 5 to 100 nm is in a range from 0.1 to 0.5, the above advantages can be more efficiently exhibited. However, when PVma/PVme exceeds 0.5, the strength of the catalyst may be reduced.

On the other hand, in the second step in the method for producing the alumina-phosphorus support, when phosphorus is added to the support so that phosphorus accounts for 0.5 to 2.5 mass % of the total amount of the support in terms of $P_2O_5$ concentration, a catalyst not having a second maximum value of pore distribution in a pore diameter range from 100 to 1000 nm can be obtained. Such a catalyst is excellent in desulfurization selectivity.

Thus, a catalyst system having both of deasphaltene and demetallization performances and desulfurization selectivity can be provided by combining the catalyst having the second maximum value of pore distribution and the catalyst not having the second maximum value of pore distribution.

It should be noted that the above parameters (1) to (5) of the present catalyst can be basically controlled according to the amount of the added phosphorus, as detailed below in Examples.

The hydrotreating catalyst composition of the invention is suitably usable for hydrotreatment, especially demetallization, of a heavy hydrocarbon oil such as a residual oil containing a metal pollutant (e.g. vanadium and nickel) and can be used in a known hydrotreatment apparatus under known operating conditions.

Since the present composition can be produced with ease and thus with high productivity, the present composition is advantageous in terms of production cost.

EXAMPLES

Though the invention will be described in detail below with reference to Examples, the scope of the invention is not limited by the Examples.

Example 1

35.2 kg of pure water was poured in a tank provided with a circulation line having two chemical supply ports. Then, 13.0 kg of aluminum sulfate aqueous solution with a 7 mass % concentration in terms of $Al_2O_3$ was added while agitated, and the solution was circulated after the temperature of the solution was raised to 70 degrees Celsius. The pH of the alumina aqueous solution at this time was 2.3. Next, 9.5 kg of sodium aluminate aqueous solution with a concentration of 22 mass % in terms of $Al_2O_3$ was added for 180 minutes, while the aqueous solution was agitated and circulated under a constant temperature of 70 degrees Celsius, to obtain an alumina hydrate. The pH after the sodium aluminate aqueous solution was added was 9.5. Next, the obtained alumina hydrate was washed with pure water at 60 degrees Celsius to remove impurities such as sodium and sulfate radical, thereby obtaining a washed cake. Further, pure water was added to the washed cake to adjust the $Al_2O_3$ concentration to 8 mass %. Then, 256 g of phosphoric acid (with a concentration of 62 mass % in terms of $P_2O_5$) was added to the alumina hydrate and was aged for three hours at 95 degrees Celsius in an aging tank having a reflux apparatus to obtain an alumina-phosphorus hydrate. Slurry obtained after the aging was dehydrated and was kneaded to be condensed to a predetermined water content while kneading the slurry with a double-arm kneader provided with a steam jacket. The obtained kneaded material was extruded in a form of 1.7 mm quatrefoil with an extruder. The obtained alumina molding was dried at 110 degrees Celsius for twelve hours and further was calcined at 680 degrees Celsius for three hours to obtain an alumina-phosphorus support a. The support a contained 5 mass % of phosphorus in terms of $P_2O_5$ concentration, and 95 mass % of aluminum in terms of $Al_2O_3$ concentration (both based on a total amount of the support).

Figure 1B:
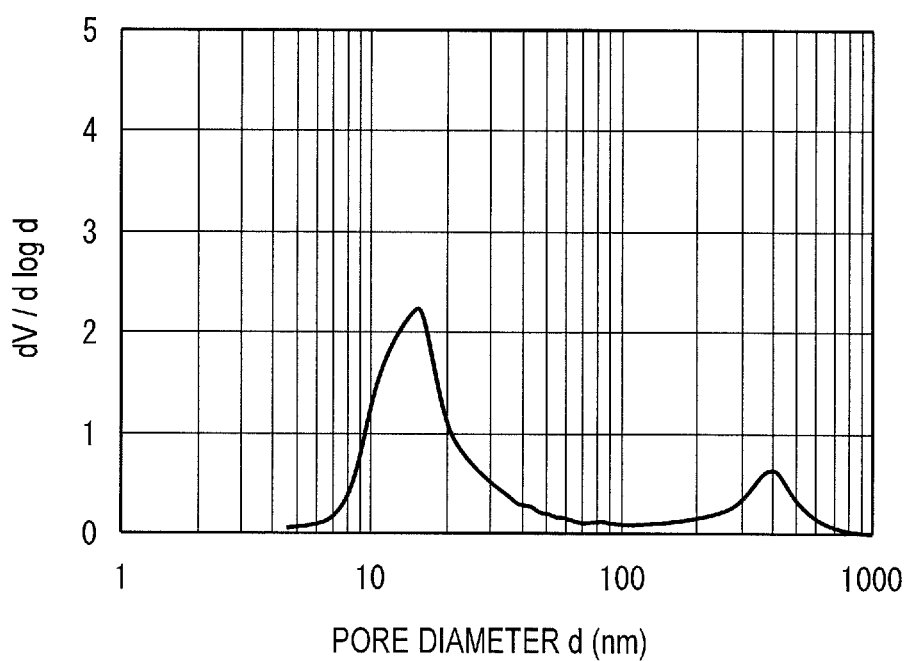
FIG. 1B is a differential graph showing the pore distribution of the catalyst A according to the invention.

After 26.6 g of molybdenum oxide and 9.7 g of nickel carbonate were suspended in 400 ml of ion-exchange water and the suspension was heated at 95 degrees Celsius for five hours while applying an appropriate refluxing measures so that the volume of the suspension was not decreased, 13.3 g of malic acid was added and dissolved therein to prepare an impregnating fluid. After the impregnating fluid was sprayed and impregnated to 500 g of the support a, the support a was dried at 250 degrees Celsius and was further calcined at 550 degrees Celsius for an hour in an electric furnace to obtain a hydrotreating catalyst A (sometimes simply referred to as "catalyst A" hereinafter). The metal components of the catalyst A were 5 mass % of $MoO_3$ (based on the total amount of the catalyst) and 1 mass % of NiO (based on the total amount of the catalyst). The properties of the catalyst A are shown in Table 1. Further, FIGS. 1A and 1B respectively show integral and differential graphs of pore distribution of the hydrotreating catalyst A.

Example 2

Figure 2A:
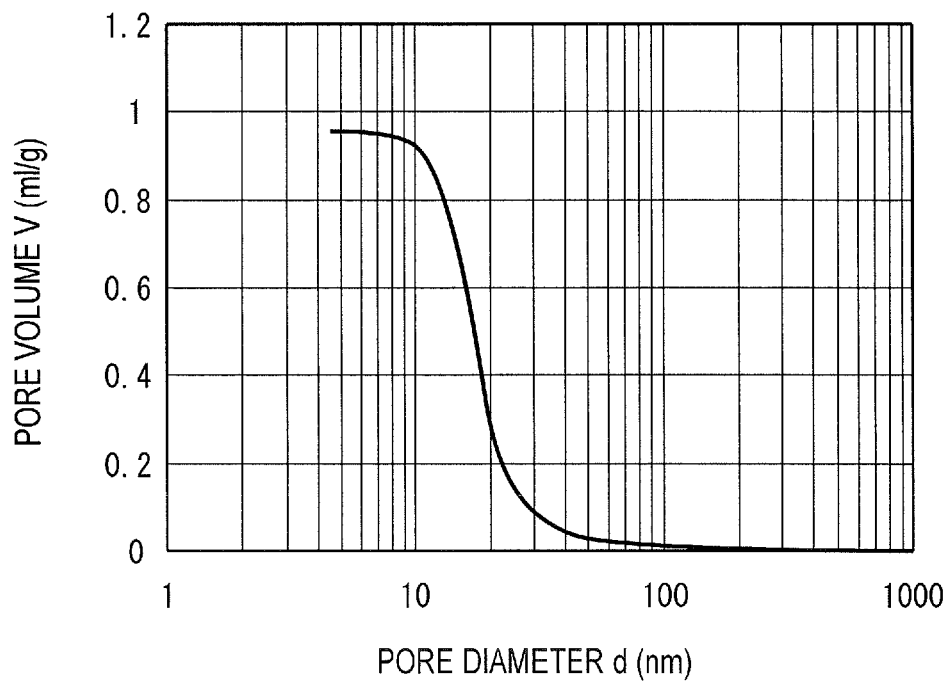
FIG. 2A is an integral graph showing a pore distribution of a catalyst B according to the invention.
Figure 2B:
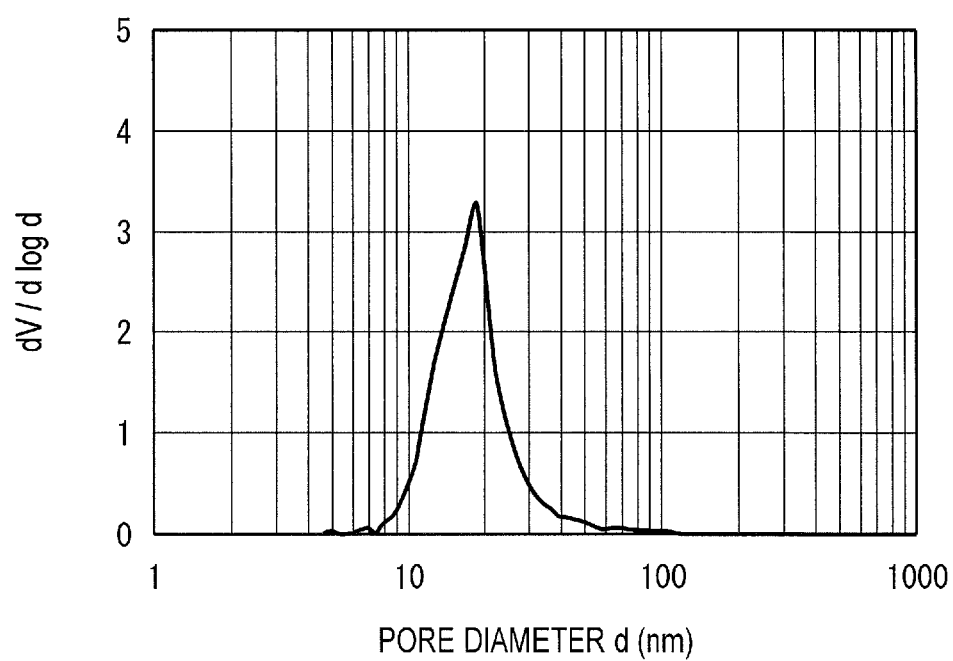
FIG. 2B is a differential graph showing the pore distribution of the catalyst B according to the invention.

An alumina-phosphorus support b was obtained in the same manner as in Example 1 except that 99.4 g of phosphoric acid was added. The support b contained 2 mass % of phosphorus in terms of $P_2O_5$ concentration, and 98 mass % of aluminum in terms of $Al_2O_3$ concentration (both based on a total amount of the support). A catalyst B was obtained in the same manner as in Example 1 using the support b. The properties of the catalyst B are shown in Table 1. Further, FIGS. 2A and 2B respectively show integral and differential graphs of pore distribution of the hydrotreating catalyst B.

Example 3

An alumina-phosphorus support c was obtained in the same manner as in Example 1 except that 150.7 g of phosphoric acid was added. The support c contained 3 mass % of phosphorus in terms of $P_2O_5$ concentration, and 97 mass % of aluminum in terms of $Al_2O_3$ concentration (both based on a total amount of the support). A catalyst C was obtained in the same manner as in Example 1 using the support c. The properties of the catalyst C are shown in Table 1.

Comparative 1

An alumina support d was obtained in the same manner as in Example 1 except that phosphoric acid was not added. A catalyst D was obtained in the same manner as in Example 1 using the support d. The properties of the catalyst D are shown in Table 1.

Comparative 2

An alumina-phosphorus support e was obtained in the same manner as in Example 1 except that 9.8 g of phosphoric acid was added. The support e contained 0.2 mass % of phosphorus in terms of $P_2O_5$ concentration, and 99.8 mass % of aluminum in terms of $Al_2O_3$ concentration (both based on a total amount of the support). A catalyst E was obtained in the same manner as in Example 1 using the support e. The properties of the catalyst E are shown in Table 1.

Comparative 3

An alumina-phosphorus support f was obtained in the same manner as in Example 1 except that 481.8 g of phosphoric acid was added. The support f contained 9 mass % of phosphorus in terms of $P_2O_5$ concentration, and 91 mass % of aluminum in terms of $Al_2O_3$ concentration (both based on a total amount of the support). A catalyst F was obtained in the same manner as in Example 1 using the support f. The properties of the catalyst F are shown in Table 1.

Comparative 4

An alumina-phosphorus support g was obtained in the same manner as in Example 1 except that the sodium aluminate aqueous solution was added for 10 minutes. The support g contained 5 mass % of phosphorus in terms of $P_2O_5$ concentration, and 95 mass % of aluminum in terms of $Al_2O_3$ concentration (both based on a total amount of the support). A catalyst G was obtained in the same manner as in Example 1 using the support g. The properties of the catalyst G are shown in Table 1.

The demetallization rate was calculated according to the following formula.

Demetallization rate=([metal concentration in the material oil]−[metal concentration in the hydrotreatment product oil]/[metal concentration in the material oil])×100

The desulfurization rate was calculated according to the following formula.

Desulfurization rate=([sulfur concentration in the material oil]−[sulfur concentration in the hydrotreatment product oil]/[sulfur concentration in the material oil])×100

The deasphaltene rate was calculated according to the following formula.

Deasphaltene rate=([asphaltene concentration in the material oil]−[asphaltene concentration in the hydrotreatment product oil]/[asphaltene concentration in the material oil])×100

TABLE 1

| | | Ex. 1 | Ex. 2 | Ex. 3 | Comp. 1 | Comp. 2 | Comp. 3 | Comp. 4 |
|---|---|---|---|---|---|---|---|---|
| Support | | a | b | c | d | e | f | g |
| $P_2O_5$ Conversion Concentration | mass % | 5 | 2 | 3 | 0 | 0.2 | 9 | 5 |
| Catalyst | | A | B | C | D | E | F | G |
| Metal Support Amount | mass % | $MoO_3/NiO_2$ 5/1 | $MoO_3/NiO_2$ 5/1 | $MoO_3/NiO_2$ 5/1 | $MoO_3/NiO_2$ 5/1 | $MoO_3/NiO_2$ 5/1 | $MoO_3/NiO_2$ 5/1 | $MoO_3/NiO_2$ 5/1 |
| $SA^{1)}$ | $m^2/g$ | 236 | 198 | 205 | 199 | 205 | 269 | 241 |
| $PV_T$ | ml/g | 1.10 | 0.96 | 1.03 | 0.96 | 0.97 | 1.51 | 1.02 |
| Maximum $PD^{2)}$ | nm | 15.2 | 18.5 | 16.9 | 17.6 | 17.9 | 9.5 | 12.4 |
| ΔPV/Pvme | — | 0.22 | 0.30 | 0.27 | 0.52 | 0.45 | 0.33 | 0.48 |
| Second Maximum Value in 100-1000 nm | | Yes | No | Yes | No | No | Yes | Yes |
| Pvma/Pvme | — | 0.23 | 0.01 | 0.12 | 0.01 | 0.02 | 0.46 | 0.36 |
| Pressure Capacity | N/mm | 15.2 | 23.5 | 19.6 | 8.6 | 9.8 | 6.5 | 13.1 |
| $P_2O_5$ Conversion Concentration | mass % | 4.8 | 1.9 | 2.9 | 0 | 0.2 | 8.6 | 4.8 |
| Catalyst Activity Evaluation | | | | | | | | |
| Demetallization Rate | % | 66 | 61 | 63 | 55 | 57 | 47 | 56 |
| Desulfurization Rate | % | 59 | 58 | 58 | 54 | 54 | 52 | 53 |
| Deasphaltene Rate | % | 63 | 59 | 61 | 44 | 46 | 40 | 45 |

[1] Surface specific area
[2] Pore diameter at which the maximum (peak) of pore distribution is located Catalyst Activity Evaluation Test The hydrogenation demetallization activity, desulfurization activity and deasphaltene activity of the catalysts A to C in Examples 1 to 3 and catalysts D to F in Comparatives 1 to 3 were examined using a fixed-bed microreactor under the following conditions.

Reaction Conditions;
Catalyst loading amount: 400 ml
Reaction pressure: 13.5 MPa
Liquid hourly space velocity (LHSV): 1.0 $hr^{-1}$
Hydrogen/oil ratio ($H^2/HC$): 800 $Nm^3/kl$
Reaction temperature: 370 degrees Celsius
Further, an atmospheric residue having the following properties was used as material oil.
Properties of material oil;
Density (15 degrees Celsius): 0.9761 $g/cm^3$
Asphaltene component: 3.4 mass %
Sulfur component: 4.143 mass %
Metal (Ni+V) amount: 80.5 mass %

The hydrogenation demetallization activity, desulfurization activity and deasphaltene activity were represented as demetallization rate, desulfurization rate and deasphaltene rate, and the values thereof were shown in Table 1.

Evaluation Results

According to the results shown in Table 1, it can be recognized that, due to the predetermined arrangement, the catalysts A to C according to the invention exhibit the demetallization rate and deasphaltene rate especially higher than those of the catalysts D to G of Comparatives 1 to 4 and higher desulfurization activity than that of the catalysts D to G. It can also be recognized that the catalysts A and C (Examples 1 and 3) having a second maximum value of pore distribution in a pore diameter range from 100 to 1000 nm exhibit extremely high demetallization rate and deasphaltene rate. However, it should be noted that, even when the second maximum value is present in a predetermined range, the catalyst F of Comparative 3 that does not satisfy the other requirements of the invention does not exhibit the above-described advantages of the invention. In Comparative 4, the sodium aluminate aqueous solution was added for 10 minutes unlike Example 1 to set an end pH at 9.5, thereby controlling the ratio ΔPV/PVme. As a result, since the ratio ΔPV/PVme goes outside the range defined in the invention, even when the phosphorus amount is the same as that in Example 1, the catalyst activity is deteriorated. Further, in the same manner as in Comparative 3, the second maximum value shown in a predetermined range in Comparative 4 does not contribute to the catalyst activity.

The invention claimed is:

1. A hydrotreating catalyst comprising:
an alumina-phosphorus support, where the alumina-phosphorus support is shaped in the form of a column, and
a hydrogenation active metal supported on the alumina-phosphorus support, wherein:
(1) a specific surface area of the hydrotreating catalyst is 100 m²/g or more;
(2) a total pore volume ($PV_T$) of the hydrotreating catalyst measured according to a mercury intrusion method is in a range from 0.80 to 1.50 ml/g;
(3) the hydrotreating catalyst has a maximum value of pore distribution in a pore diameter range from 10 to 30 nm;
(4) a ratio (ΔPV/PVme) of a pore volume (ΔPV) of pores with a pore diameter within a range of ±2 nm of a pore diameter at the maximum value to a pore volume (PVme) of pores with a pore diameter in a range from 5 to 100 nm is 0.40 or less;
(5) a pressure capacity of the hydrotreating catalyst is 10 N/mm or more;
(6) 0.4 to 10.0 mass % of phosphorus is contained in the hydrotreating catalyst in terms of $P_2O_5$ concentration based on a total amount of the hydrotreating catalyst; and
(7) the hydrogenation active metal is at least one metal selected from metals of VIA and VIII groups of the periodic table.

2. The hydrotreating catalyst according to claim 1, wherein
the alumina-phosphorus support contains 0.5 to 7.0 mass % of phosphorus in terms of $P_2O_5$ concentration based on a total amount of the support.

3. The hydrotreating catalyst according to claim 1, wherein
the hydrotreating catalyst contains 1 to 25 mass % of the hydrogenation active metal in terms of oxide concentration based on the total amount of the hydrotreating catalyst.

4. The hydrotreating catalyst according to claim 1, wherein
the hydrotreating catalyst has a second maximum value of the pore distribution in a pore diameter range from 100 to 1000 nm.

5. The hydrotreating catalyst according to claim 4, wherein
a ratio (PVma/PVme) of a pore volume (PVma) of pores having a pore diameter in the range from 100 to 1000 nm to the pore volume (PVme) of pores having the pore diameter in the range from 5 to 100 nm is in a range from 0.1 to 0.5.

6. The hydrotreating catalyst according to claim 1, wherein
the hydrotreating catalyst is used for treating a heavy hydrocarbon oil.

7. The hydrotreating catalyst according to claim 1, wherein
the specific surface area of the hydrotreating catalyst is in a range from 150 to 250 m²/g.

8. The hydrotreating catalyst according to claim 1, wherein
the maximum value of pore distribution of the hydrotreating catalyst is in a pore diameter range from 12 to 25 nm.

9. The hydrotreating catalyst according to claim 1, wherein
the ΔPV/PVme ratio is 0.30 or less.

10. The hydrotreating catalyst according to claim 1, wherein
the maximum value of pore distribution of the hydrotreating catalyst is in a pore diameter range from 10 to 20 nm.

11. The hydrotreating catalyst according to claim 1, wherein
the maximum value of pore distribution of the hydrotreating catalyst is in a pore diameter range from 15.2 to 18.5 nm, and
the ΔPV/PVme ratio is in a range from 0.22 to 0.30.

12. The hydrotreating catalyst according to claim 1, wherein
the hydrotreating catalyst is comprised in a fixed-bed apparatus.

13. A method for producing the hydrotreating catalyst of claim 1, the method comprising:
producing an alumina-phosphorus support; and
supporting a hydrogenation active metal on the alumina-phosphorus support, wherein
the producing of the support comprises:
a first step of obtaining an alumina hydrate by preparing an acidic aluminum aqueous solution of which pH is adjusted in a range from 2.0 to 5.0 and, while agitating the acidic aluminum aqueous solution, adding a basic aluminum aqueous solution so that the pH falls in a range from 7.5 to 10.0;
a second step of obtaining an alumina-phosphorus hydrate by adding phosphorus to the alumina hydrate from which a residual product salt of the alumina hydrate is removed; and
a third step of obtaining an alumina-phosphorus support by aging, kneading, molding, drying and calcining the alumina-phosphorus hydrate in turn.

14. The method for producing the hydrotreating catalyst according to claim 13, wherein
phosphorus is added to the alumina hydrate in the second step so that 3.0 to 7.0 mass % of phosphorus in terms of $P_2O_5$ concentration based on a total amount of the support is contained in the alumina hydrate.

15. The method for producing the hydrotreating catalyst according to claim 13, wherein
phosphorus is added to the alumina hydrate in the second step so that 0.5 to 2.5 mass % of phosphorus in terms of $P_2O_5$ concentration based on a total amount of the support is contained in the alumina hydrate.

* * * * *